(12) United States Patent
Yu

(10) Patent No.: US 9,231,421 B2
(45) Date of Patent: Jan. 5, 2016

(54) ELECTROMAGNETIC INDUCTION DEVICE OF COIL TYPE FOR CHARGING AND SUPPLYING POWER

(76) Inventor: Shaoming Yu, Dongguan (CN)

( * ) Notice: Subject to any disclaimer, the term of this patent is extended or adjusted under 35 U.S.C. 154(b) by 238 days.

(21) Appl. No.: 14/117,630

(22) PCT Filed: May 3, 2012

(86) PCT No.: PCT/CN2012/071950
§ 371 (c)(1),
(2), (4) Date: Nov. 14, 2013

(87) PCT Pub. No.: WO2013/102320
PCT Pub. Date: Jul. 11, 2013

(65) Prior Publication Data
US 2014/0084866 A1    Mar. 27, 2014

(30) Foreign Application Priority Data
Jan. 6, 2012  (CN) .................... 2012 2 0003551 U

(51) Int. Cl.
*H02J 7/00* (2006.01)
*H01R 13/66* (2006.01)
*H01R 103/00* (2006.01)

(52) U.S. Cl.
CPC .......... *H02J 7/0042* (2013.01); *H01R 13/6675* (2013.01); *H01R 2103/00* (2013.01)

(58) Field of Classification Search
CPC ................................ H02J 7/0042; H02J 5/005
USPC .................................. 320/107–108, 112–114
See application file for complete search history.

(56) References Cited

U.S. PATENT DOCUMENTS

2013/0193915 A1*  8/2013  Jung .................... A61C 17/224
320/108

* cited by examiner

*Primary Examiner* — Paul Dinh

(57) ABSTRACT

An electromagnetic induction device of coil type for charging and supplying power, the device comprises a split type electrical body (1) and a charging body (2); wherein the electrical body (1) comprises a first casing (11), a first charging circuit board (12) fixed inside the first casing (11), a chargeable battery (13), a load (14) and a first coil (15) connected with the first charging circuit board (12); the charging body (2) comprises a second casing (21), a second charging circuit board (22) fixed inside the second casing (21), a second coil (23) connected with the first charging circuit board (22), a charging plug (24) installed in the second casing (21); the said second casing (21) with a annular sleeve-joint portion (211) sleeved outside of the first casing (11), and the second coil (23) is arranged in the annular sleeve-joint portion (211), and when the electrical body (1) is connected with the charging body (2) in sleeve mode, the first coil (15) is arranged right inside the second coil (23). The device can supply power to a battery of an electrical apparatus by means of non-contact manner.

1 Claim, 4 Drawing Sheets

ELECTROMAGNETIC INDUCTION DEVICE OF COIL TYPE FOR CHARGING AND SUPPLYING POWER

FIELD OF THE INVENTION

The present invention relates to technical field of electrical and electronic device, more particularly an electromagnetic induction device of coil type for charging and supplying power.

BACKGROUND OF THE INVENTION

The structure of small electrical appliances such as flashlight and electrical shaver usually was designed for chargeable. In general, there are two methods of charging: one is by means of the power cable, the other is directly by charging plug installed in electrical appliances. The former needs to set a voltage-transforming device in the end of plug, the size of which is bigger and more copper wire has been use; the same problems as the latter, to sum up, the current chargeable electrical device sizes are larger and the costs are higher.

SUMMARY OF THE PRESENT INVENTION

The purpose of present invention is to provide an electromagnetic induction device of coil type for charging and supplying power.

For achieving the purpose of present invention, the technical method is: an electromagnetic induction device of coil type for charging and supplying power, the device comprises a split type electrical body and a charging body; wherein the electrical body comprises a first casing, a first charging circuit board fixed inside the first casing, a chargeable battery, a load and a first coil connected with the first charging circuit board; the charging body comprises a second casing, a second charging circuit board fixed inside the second casing, a second coil connected with the first charging circuit board, a charging plug installed in the second casing; the said second casing with a annular sleeve-joint portion sleeved outside of the first casing, and the second coil is arranged in the annular sleeve-joint portion, and when the electrical body is connected with the charging body in sleeve mode, the first coil is arranged right inside the second coil.

The present invention is to electrical devices battery for power supply by electromagnetic induction of two coils, which can decrease the coil size, furthermore, it can decrease the product size and the copper wire consumption as well as lower its cost.

DETAILED DESCRIPTION OF THE PRESENT INVENTION

Figure 1:
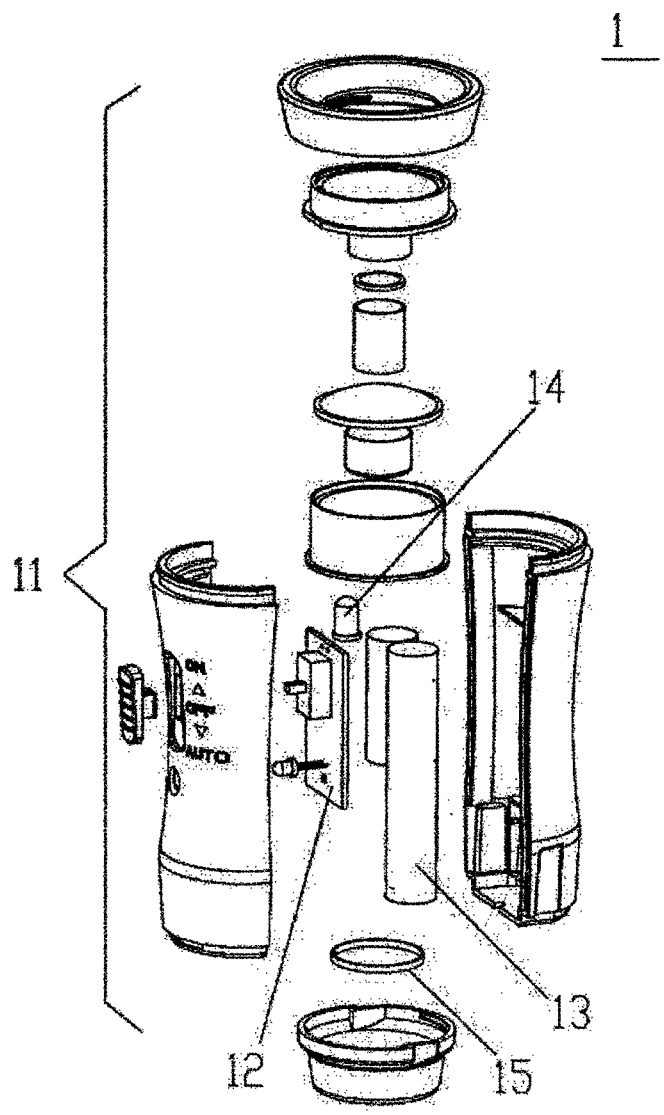
FIG. 1 is an Exploded View Diagram of an embodiment of the electrical body according to the present invention.
Figure 2:
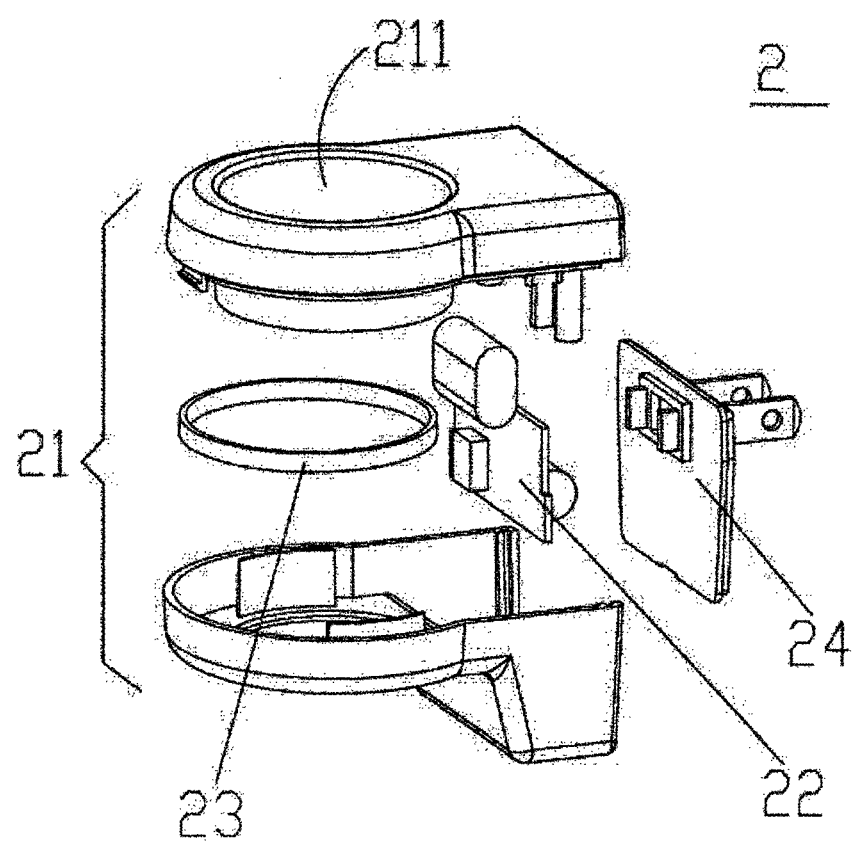
FIG. 2 is an Exploded View Diagram of an embodiment of the charging body according to the present invention.
Figure 3:
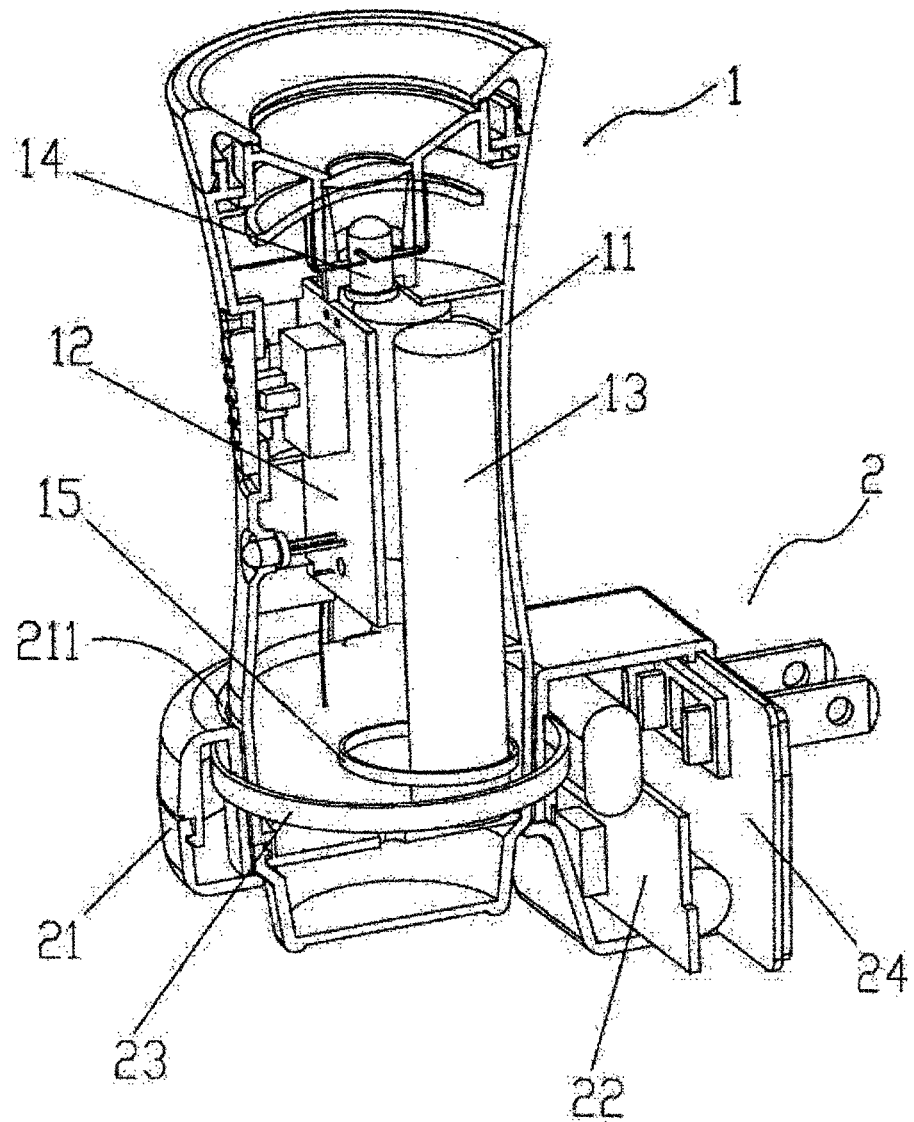
FIG. 3 is a Schematic View showing an embodiment of the FIG. 1 in combination with FIG. 2 according to the present invention.

Referring to FIG. 1-3, an electromagnetic induction device of coil type for charging and supplying power, the device comprises a split type electrical body (1) and a charging body (2); wherein the electrical body (1) comprises a first casing (11), a first charging circuit board (12) fixed inside the first casing (11), a chargeable battery (13), a load (14) and a first coil (15) connected with the first charging circuit board (12); the charging body (2) comprises a second casing (21), a second charging circuit board (22) fixed inside the second casing (21), a second coil (23) connected with the first charging circuit board (22), a charging plug (24) installed in the second casing (21); the said second casing (21) with a annular sleeve-joint portion (211) sleeved outside of the first casing (11), and the second coil (23) is arranged in the annular sleeve-joint portion (211), and when the electrical body (1) is connected with the charging body (2) in sleeve mode, the first coil (15) is arranged right inside the second coil (23).

when the charging plug (24) was connected electrically, the second charging circuit board (22) of the charging body (2) generated electricity, and the induced current was produced for the first coil (15) of the charging body (1) by flowing the charging current past to the second coil (23) by means of electromagnetic induction, so the first charging circuit board (12) charging to the chargeable battery (13) and then to the load (14) for power supply. Therefore, the present invention is to electrical devices battery for power supply by electromagnetic induction of two coils, which can decrease the coil size, furthermore, it can decrease the product size and the copper wire consumption as well as lower its cost.

Figure 4:
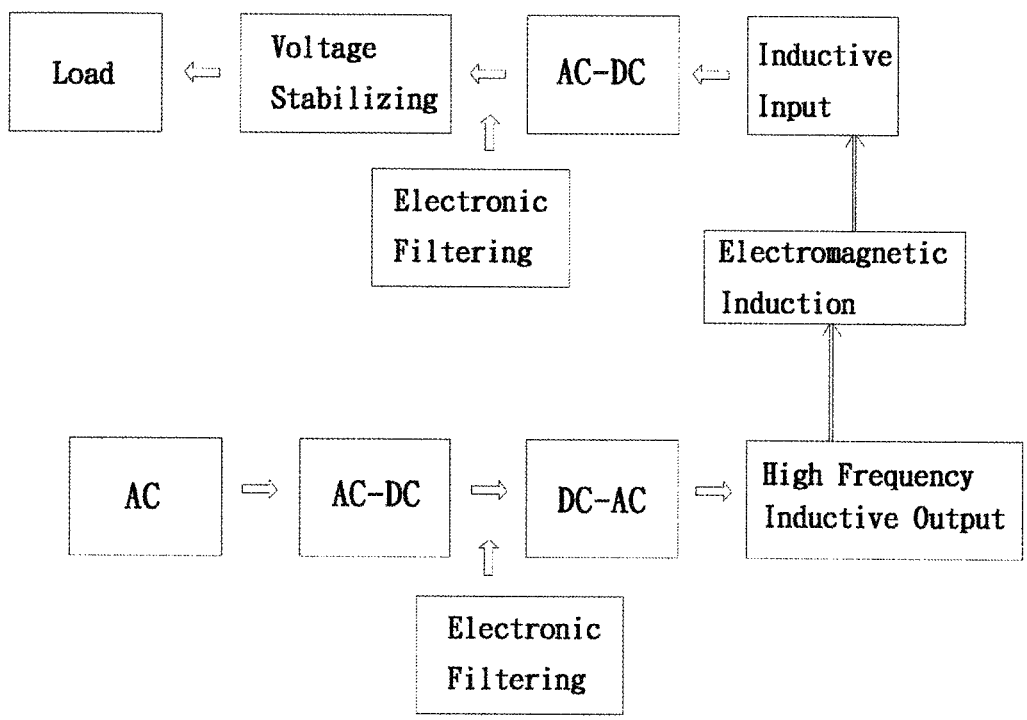
FIG. 4 is a Function Block Diagram of the present invention.

As shown in FIG. 4 the electric circuit as a charging output of the second charging circuit board (22) was used in output circuit of high frequency induction, improved the frequency of the output, and the first charging circuit board (12) as a charging input was used in resonance absorption for implementing electromagnetic induction charging function in the present invention.

The electrical body (1) and the charging body (2) are the separated structure, which are easy to sleeve-joint and remove while not charging. It does not affect the electrical body (1) in use.

As shown in drawings is an embodiment of the present invention, the said load of the present invention can also be a small machine, or a light etc. thereby constituting an electric fan, an electric razor, desk lamp, headlight and variety of electrical appliance.

With respect to the present invention details of a switch, an indicator and a fixed load in the electrical body (1) need not be given here.

To sum up, the present invention that is smaller and cheaper can be variety of small or tiny electromagnetic induction charging products or devices.

What is claimed is:

1. An electromagnetic induction device of coil type for charging and supplying power to a battery, the electromagnetic induction device comprising:

a split type electric body and a charging body; wherein the electrical body comprises a first casing, a first charging circuit board fixed inside the first casing, a chargeable battery, a load and a first coil connected with the first charging circuit board; the charging body comprises a second casing, a second charging circuit board fixed inside the second casing, a second coil connected with the second charging circuit board, a charging plug installed in the second casing; the second casing with an annular sleeve-joint portion sleeved outside of the first casing, and the second coil is arranged in the annular sleeve-joint portion, and when the electrical body is connected with the charging body in sleeve mode, the first coil is arranged right inside the second coil.

\* \* \* \* \*